(12) United States Patent
Ebert (10) Patent No.: US 11,150,437 B1
(45) Date of Patent: Oct. 19, 2021

(54) PRESCRIPTION ADJUSTMENT METHODS AND SYSTEMS FOR VARIFOCAL SUBSYSTEMS

(71) Applicant: Facebook Technologies, LLC, Menlo Park, CA (US)

(72) Inventor: Ryan Michael Ebert, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 374 days.

(21) Appl. No.: 16/280,471

(22) Filed: Feb. 20, 2019

Related U.S. Application Data (60) Provisional application No. 62/756,167, filed on Nov. 6, 2018.

(51) Int. Cl.
*G02B 27/01* (2006.01)
*G02B 7/08* (2021.01)
*G02B 27/00* (2006.01)
*G06F 3/01* (2006.01)
*G06T 19/00* (2011.01)

(52) U.S. Cl.
CPC ........... *G02B 7/08* (2013.01); *G02B 27/0093* (2013.01); *G02B 27/0172* (2013.01); *G02B 27/0179* (2013.01); *G06F 3/012* (2013.01); *G06F 3/013* (2013.01); *G06T 19/006* (2013.01); *G02B 2027/0187* (2013.01)

(58) Field of Classification Search
CPC . G02B 7/09; G02B 7/10; G02B 7/102; G02B 7/105; G02B 27/01; G02B 27/0101; G02B 27/0149; G02B 27/0172; G02B 27/0179; G02B 27/0093; G02B 2027/0154; G02B 2027/0178; G02B 2027/0187

See application file for complete search history.

(56) References Cited

U.S. PATENT DOCUMENTS

2012/0127062 A1\* 5/2012 Bar-Zeev ........... G02B 27/0172
345/6

\* cited by examiner

*Primary Examiner* — Joseph P Martinez
(74) *Attorney, Agent, or Firm* — FisherBroyles, LLP (57) ABSTRACT

Head-mounted display systems may include a display subsystem, an optics subsystem, a prescription accommodation subsystem, and a varifocal adjustment subsystem. The prescription accommodation subsystem may include a prescription accommodation actuator that is configured to adjust a focus of a displayed image to account for the user's visual refractive error. The varifocal adjustment subsystem may include a varifocal adjustment actuator configured to further adjust the focus of the image to change a perceived view of the image on the display subsystem. Various other methods, systems, and computer-readable media are also disclosed.

18 Claims, 6 Drawing Sheets

PRESCRIPTION ADJUSTMENT METHODS AND SYSTEMS FOR VARIFOCAL SUBSYSTEMS

CROSS-REFERENCE TO RELATED APPLICATION

This application claims the benefit of U.S. Provisional Patent Application Ser. No. 62/756,167, titled "PRESCRIPTION ADJUSTMENT METHODS AND SYSTEMS FOR VARIFOCAL SUBSYSTEMS," filed Nov. 6, 2018, the entire disclosure of which is incorporated herein by reference.

BACKGROUND

A head-mounted display ("HMD") system may be part of an artificial reality system that simulates virtual environments (e.g., virtual reality) or overlays visual content on a view of the real word (e.g., augmented reality). For example, stereoscopic images may be displayed on a pair of electronic displays inside an HMD to simulate the illusion of depth, and head-and-eye-tracking sensors may be used to estimate which portions of the virtual environment are being viewed by a user.

Some HMDs may include a varifocal actuation subsystem that changes a focal distance between a lens system in the HMD and the electronic display(s). For example, a three-dimensional (3D) virtual scene may be presented on an electronic display of the HMD, and a focal length of an optics subsystem (that directs image light from the electronic display towards eyes of the user) may be adjusted using a varifocal actuation subsystem. The adjustments may be made based on a location or object within a virtual scene being displayed or based on eye-tracking data, for example.

Moreover, some HMDs may be designed to fit over corrective lenses of a user. However, wearing corrective lenses can detract from the user experience and can decrease the effectiveness of eye-tracking systems (which may have difficulty tracking eye movement through eyeglasses). Therefore, in some HMD systems, a user can obtain a prescription lens to insert into the HMD for correcting the user's refractive error without separate prescription glasses. However, such prescription lens inserts may be expensive and may require switching out when different users use the HMD.

SUMMARY

As will be described in greater detail below, the present disclosure describes HMD systems and methods for separately adjusting a focus of an image to account for a user's visual refractive error and to provide varifocal adjustments during use.

In some embodiments, head-mounted display systems may include a display subsystem, an optics subsystem, a prescription accommodation subsystem, and a varifocal adjustment subsystem. The display subsystem may be configured to display an image to a user. The optics subsystem may include at least one lens. The prescription accommodation subsystem may include a prescription accommodation actuator that is configured to adjust a focus of the image to account for the user's visual refractive error. The varifocal adjustment subsystem may include a varifocal adjustment actuator configured to further adjust the focus of the image viewed by the user through the optics subsystem to change a perceived view of the image on the display subsystem.

In some examples, the prescription accommodation subsystem may be configured to adjust the focus of the image by adjusting a distance between the display subsystem and the optics subsystem. The varifocal adjustment actuator may be configured to modify a shape of a lens of the optics subsystem to adjust the focus of the image. The varifocal adjustment subsystem may be mounted on the prescription accommodation subsystem to be moved by the prescription accommodation actuator. The varifocal adjustment actuator may be configured to adjust the focus of the image by adjusting a distance between the display subsystem and the optics subsystem. The varifocal adjustment actuator may be mounted on a movable structure of the prescription accommodation subsystem. The prescription accommodation actuator may include a manual adjustment input for the user to adjust a position of the varifocal adjustment subsystem within the head-mounted display system. The head-mounted display system may also include a locking system configured to lock a setting of at least one of the prescription accommodation subsystem or the varifocal adjustment subsystem when the head-mounted display system is powered down.

In some embodiments, the present disclosure includes methods for adjusting at least one optical property of a head-mounted display system. In accordance with such methods, an image may be displayed on a display subsystem of a head-mounted display system for viewing by a user through an optics subsystem that includes at least one lens. A focus of the image may be adjusted, with a prescription accommodation actuator of a prescription accommodation subsystem, to account for the user's visual refractive error. The focus of the image viewed by the user through the optics subsystem may be further adjusted, with a varifocal adjustment actuator of a varifocal adjustment subsystem, to change a perceived view of the image on the display subsystem.

In some examples, the step of adjusting to account for the user's visual refractive error may be performed based on an input from the user. The step of adjusting to account for the user's visual refractive error may be performed based on one or more settings, retrieved from a computer memory, corresponding to the user's visual refractive error. Adjusting, with the prescription accommodation actuator, the focus of the image may include adjusting the distance between the display subsystem and the optics subsystem across a maximum prescription range. Further adjusting, with the varifocal adjustment actuator, the focus of the image may include adjusting the distance between the display subsystem and the optics subsystem across a maximum varifocal range that is shorter than the maximum prescription range.

The step of further adjusting, with the varifocal adjustment actuator, the focus of the image may be performed using one or more piezoelectric actuators, one or more voice coil actuators, and/or a rotary actuator and a leadscrew of the varifocal adjustment subsystem. The step of further adjusting, with the varifocal adjustment actuator, the focus of the image may be performed based at least in part on data received from an eye-tracking system. The step of adjusting, with the prescription accommodation actuator, the focus of the image may include manipulating a mechanical user input. Adjusting, with the prescription accommodation actuator, the focus of the image may include adjusting a position of the varifocal adjustment actuator. The step of further adjusting, with the varifocal adjustment actuator, the focus of the image may be performed in response to an electronic signal. The user's visual refractive error may be automatically detected prior to adjusting to account for the user's visual refractive error.

In some examples, the above-described method may be encoded as computer-readable instructions on a computer-readable medium. For example, a computer-readable medium may include one or more computer-executable instructions that, when executed by at least one processor of a computing device, may cause the computing device to display an image on a display subsystem of a head-mounted display system for viewing by a user through an optics subsystem comprising at least one lens, adjust, with a prescription accommodation actuator of a prescription accommodation subsystem, a focus of the image on the display subsystem to account for a user's visual refractive error, and adjust, with a varifocal adjustment actuator of a varifocal adjustment subsystem, the focus of the image on the display subsystem viewed by the user through to optics subsystem to change a perceived view of the image on the display subsystem.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to HMD systems and methods for separately adjusting a focus of an image to account for a user's visual refractive error and to provide varifocal adjustments during use. As will be explained in greater detail below, embodiments of the instant disclosure may include an HMD system with both varifocal adjustment and prescription accommodation. Actuation for prescription accommodation may be separate from a real-time or semi-real-time varifocal adjustment. Thus, a prescription accommodation subsystem may include a prescription accommodation actuator that is configured to adjust a focus of a displayed image to account for the user's visual refractive error. A varifocal adjustment subsystem may include a separate varifocal adjustment actuator that is configured to further adjust the focus of the image viewed by the user to change a perceived view of the image. The varifocal adjustments may be made in response to, for example, a movement of a virtual object in the displayed image and/or movement of the user's eye(s).

Figure 1:
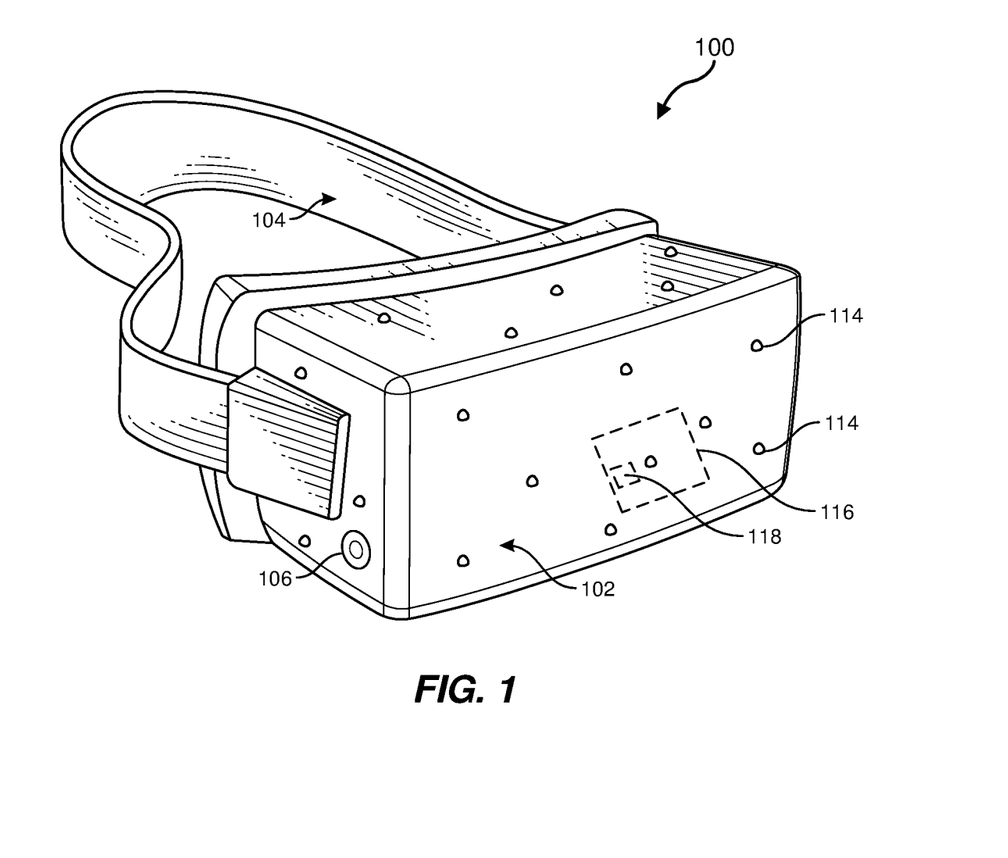
FIG. 1 shows an example HMD, in accordance with at least one embodiment of the present disclosure.
Figure 2:
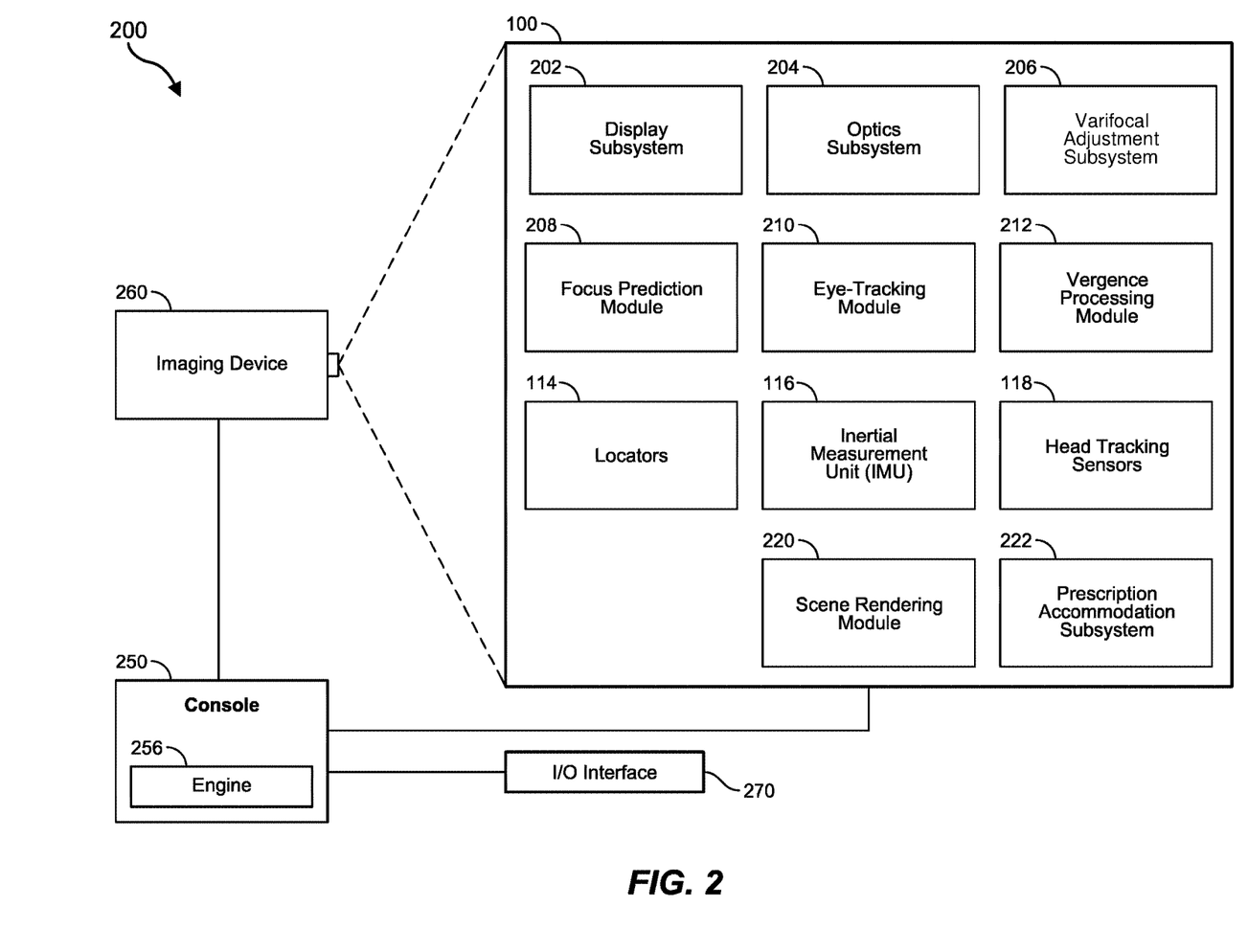
FIG. 2 shows a schematic diagram of an HMD, in accordance with at least one embodiment.
Figure 3:
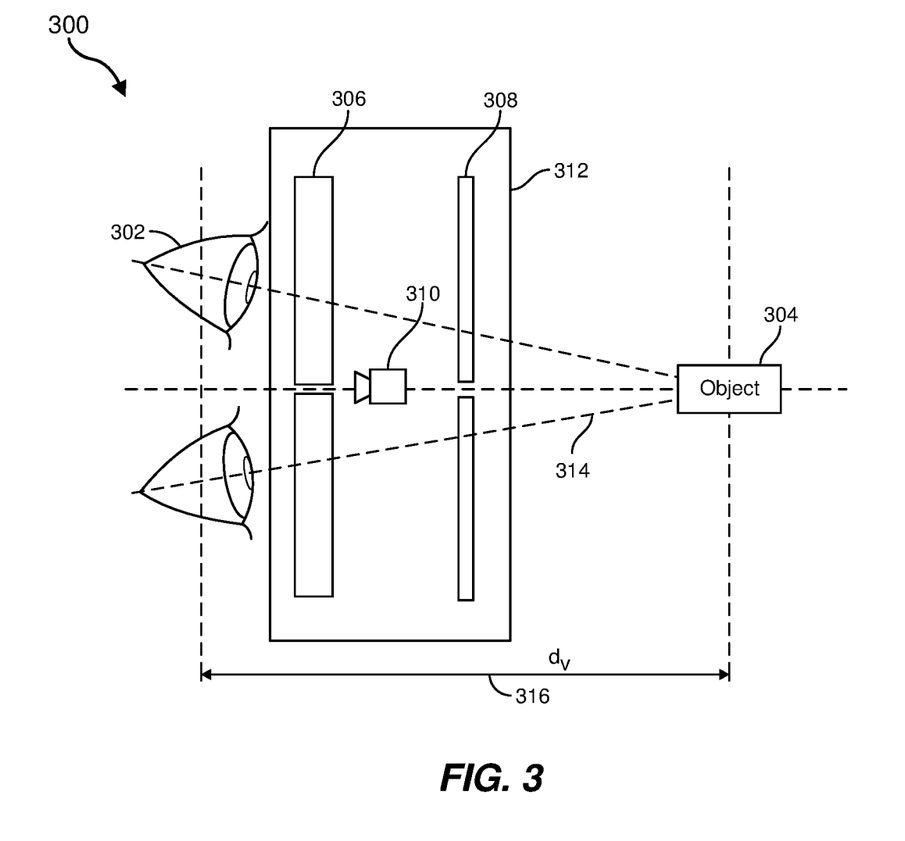
FIG. 3 shows a cross-sectional view of an HMD including an eye-tracking camera, in accordance with at least one embodiment.
Figure 5:
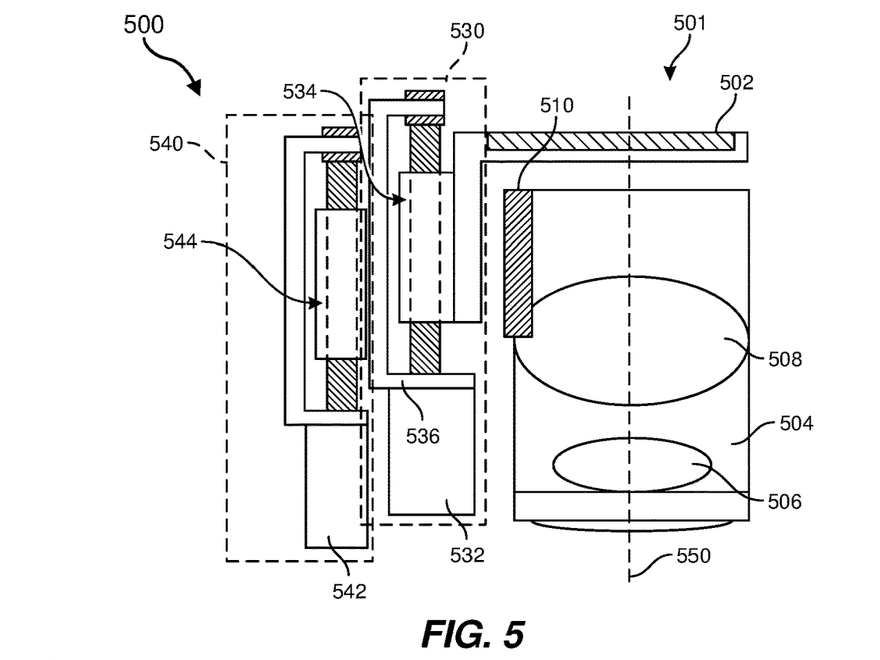
FIG. 5 shows a cross-sectional view of an assembly of an HMD including a varifocal adjustment subsystem and a prescription accommodation subsystem, in various embodiments.
Figure 6:
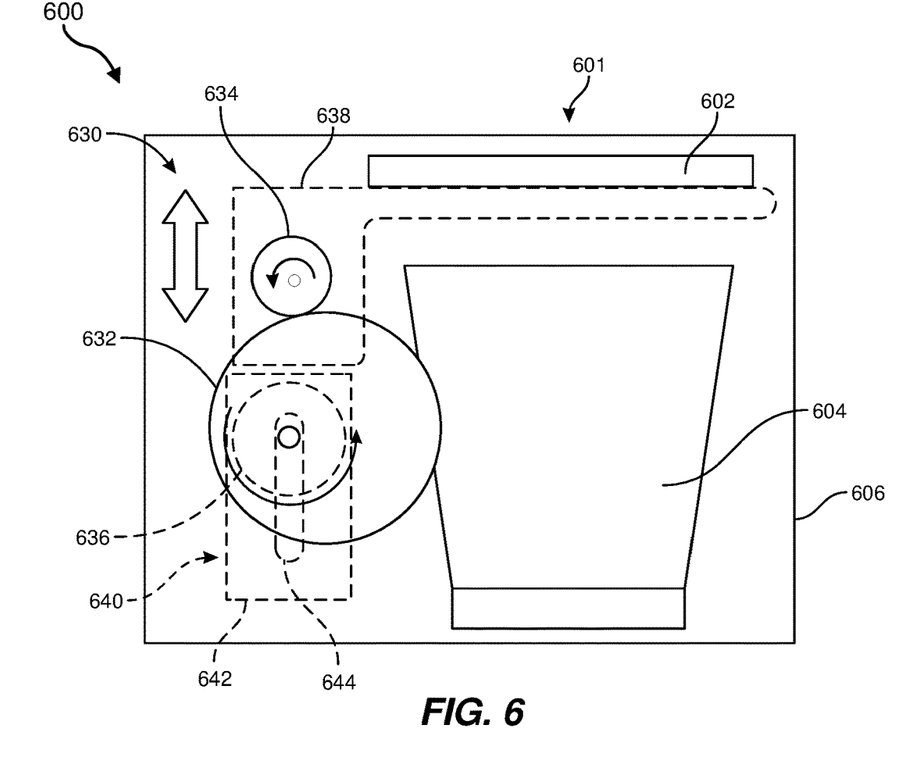
FIG. 6 shows a cross-sectional view of an assembly of an HMD including a varifocal adjustment subsystem and a prescription accommodation subsystem, according to additional embodiments.
Figure 7:
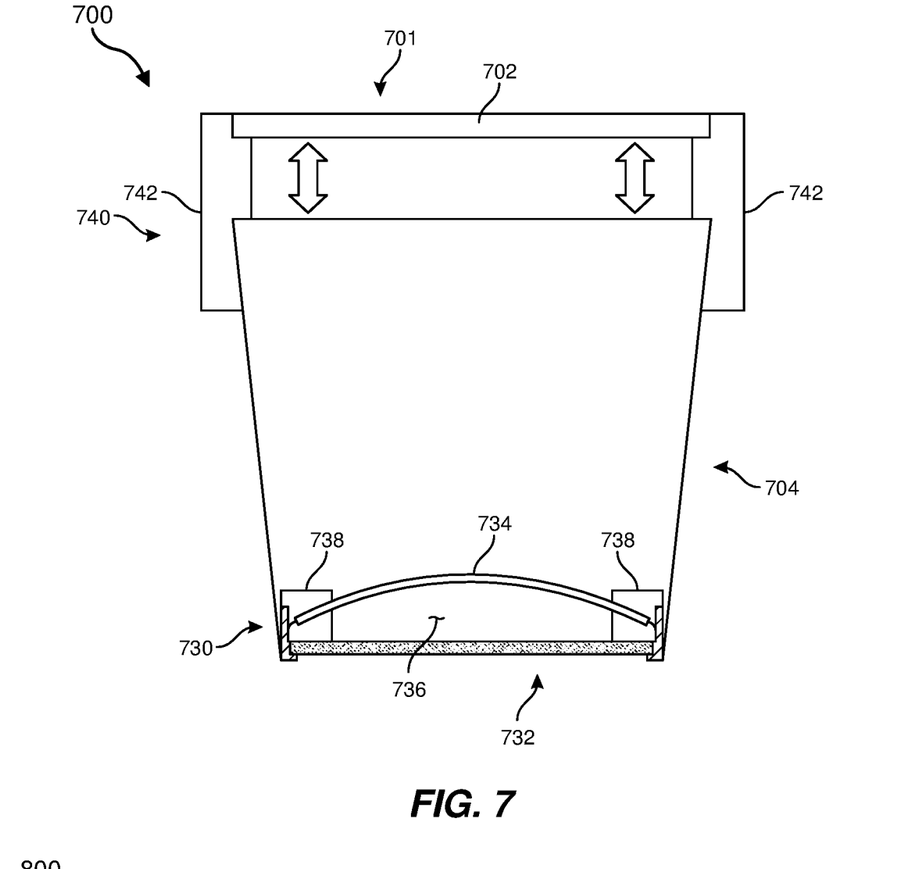
FIG. 7 shows a cross-sectional view of an assembly of an HMD including a varifocal adjustment subsystem and a prescription accommodation subsystem, according to further embodiments.
Figure 8:
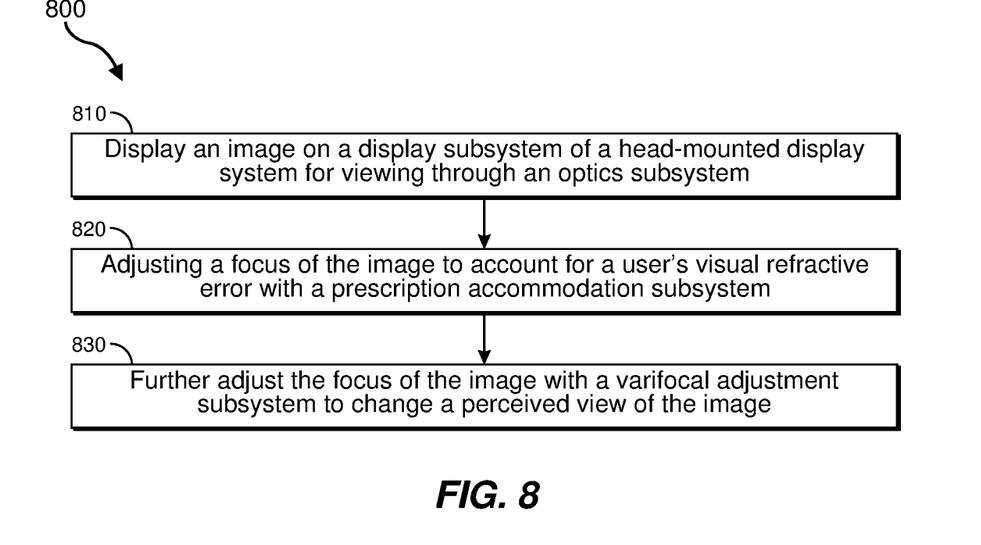
FIG. 8 is a flow diagram illustrating a method for adjusting at least one optical property of an HMD system, according to some embodiments of the present disclosure.

The following will provide, with reference to FIGS. 1 and 2, detailed descriptions of an example HMD according to embodiments of the present disclosure. With reference to FIG. 3, detailed descriptions of an HMD are provided to demonstrate eye-tracking and focal distance of an image. Detailed descriptions are also provided of an HMD capable of both prescription accommodation adjustments and varifocal adjustments with reference to FIGS. 4A and 4B. With reference to FIGS. 5-7, detailed descriptions are provided of various example HMDs and actuation mechanisms for prescription accommodation and varifocal adjustments. With reference to FIG. 8, detailed descriptions of an example method for adjusting at least one optical property of a head-mounted display system are provided.

Turning to FIGS. 1 and 2, FIG. 1 shows an example HMD 100 and FIG. 2 shows the HMD 100 in schematic form, as part of an HMD system 200. As shown in FIG. 1, HMD 100 may include a front rigid body 102 and a headband 104 for positioning the HMD 100 on a user's head. A prescription adjustment control element 106 may, in some embodiments, be located on an exterior of the front rigid body 102. The prescription adjustment control element 106 may be a component of a prescription accommodation subsystem 222 (FIG. 2) for adjusting a focus of an image displayed by the HMD 100 to correct for a user's refractive error(s), as will be explained in further detail below.

The front rigid body may house one or more electronic display elements, such as a display subsystem 202 (shown in FIG. 2), locators 114, inertial measurement unit (IMU) 116, and/or head tracking sensors 118. In one example, the head tracking sensors 118 may be located within the IMU 116. In some embodiments, such as where the HMD 100 is used in augmented reality (AR) and/or mixed reality (MR) applications, portions of the HMD 100 may be at least partially transparent, such that a user wearing the HMD 100 may have a view of the external environment through at least a portion of the HMD 100. For example, at least one component of the display subsystem 202 may be substantially transparent. In one example, the display subsystem 202 may include an image combiner lens positioned within the front rigid body 102 for reflecting an image originating from a projector toward the user's eye(s). Additionally or alternatively, one or more sides of the front rigid body 102 may be substantially transparent.

In some examples, each of the locators 114 may emit light that is detectable by an imaging device 260 (shown in FIG. 2). In some examples, the locators 114 may be located in known fixed positions on the front rigid body 102 relative to one another and relative to a reference point. For example, the locators 114, or portions of the locators 114, may be located on a front side, a top side, a bottom side, a right side, and/or a left side of the front rigid body 102.

As used herein, any relational term, such as "first," "second," "top," "bottom," "front," "right," "left," etc., is used for clarity and convenience in understanding the disclosure and accompanying drawings and does not connote or depend on any specific preference, orientation, or order, except where the context clearly indicates otherwise.

As noted above, FIG. 2 shows an example HMD system 200 in which the HMD 100 may operate. In various examples, the HMD system 200 may be a VR system, an AR system, an MR system, or some combination thereof. As shown in FIG. 2, the HMD system 200 may include the HMD 100, the imaging device 260, and an I/O interface 270, which may each be coupled to a console 250. The console 250 may provide rendered video or other data from engine 256. The console 250 may be a separate unit from the HMD 100 (as illustrated in FIG. 2), or the console 250 may be internal to the HMD 100. While FIG. 2 shows a single HMD 100, a single imaging device 260, and a single I/O interface 270, in other embodiments, any number of these components may be included in the HMD system 200. For example, the console 250 may communicate with multiple HMDs 100, each with an associated I/O interface 270 being monitored by an associated imaging device 260. In alternative configurations, different and/or additional components may also be included in the HMD system 200.

The HMD 100 may present any of a variety of content to a user. Examples of content that may be presented by the HMD 100 include, without limitation, images, video, audio, and various combinations thereof. In some examples, a separate device (e.g., speakers and/or headphones) may present audio content received from the HMD 100 and/or the console 250.

As shown in FIG. 2, the HMD 100 may include a display subsystem 202, an optics subsystem 204, a varifocal adjustment subsystem 206, a focus prediction module 208, an eye-tracking module 210, a vergence processing module 212, one or more locators 114, an internal measurement unit (IMU) 116, head tracking sensors 118, a scene rendering module 220, and/or a prescription accommodation subsystem 222.

The optics subsystem 204 may include any component and/or apparatus configured to direct light from the display subsystem 202 (and, e.g., via an exit pupil) for viewing by a user. The optics subsystem 204 may include one or more optical elements, such as apertures, Fresnel lenses, convex lenses, concave lenses, filters, waveguides, reflectors, image combiner lenses, and so forth, and may include combinations of different optical elements (e.g., which may operate in tandem to modify optical properties of one or more images presented to the user). In some embodiments, one or more optical elements in optics subsystem 204 may have one or more treatments and/or coatings, such as anti-reflective coatings. In some examples, magnification of the image light produced by the optics subsystem 204 may allow for a relatively smaller display subsystem 202 (e.g., that is physically smaller, weighs less, and/or consumes less power than displays that operate without the benefit of the optics subsystem 204) than without magnification. Additionally, magnification of the image light may increase a field of view of the content displayed by the HMD 100. For example, the field of view of the displayed content may be such that the displayed content is presented using all or almost all (e.g., 150 degrees diagonal) of the user's field of view.

The optics subsystem 204 may be configured to correct one or more optical errors. Examples of optical errors include, without limitation, barrel distortion, pincushion distortion, longitudinal chromatic aberration, transverse chromatic aberration, spherical aberration, chromatic aberration, field curvature, and astigmatism. In some embodiments, content provided to the display subsystem 202 for display may be pre-distorted, and the optics subsystem 204 may correct the distortion when image light is received from the display subsystem 202 generated based on the content.

The varifocal adjustment subsystem 206 may be configured to cause the optics subsystem 204 to adjust a focus (e.g., the focal distance) of an image displayed by the HMD 100. For example, the varifocal adjustment subsystem 206 may adjust the optical power of a varifocal lens within the optics subsystem 204. In one embodiment, the varifocal adjustment subsystem 206 may physically change a distance between the display subsystem 202 and at least a component of the optics subsystem 204 (e.g., by moving the display subsystem 202, the optics subsystem, and/or a component thereof). For example, the varifocal adjustment subsystem 206 may include one or more varifocal adjustment actuators that may be configured to move the display subsystem 202 and/or the optics subsystem 204 to adjust the distance between them. In some examples, the varifocal adjustment subsystem 206 may move and/or translate two lenses (e.g., within the optics subsystem 204) relative to each other to change the focus (e.g., focal distance) of the image of the HMD 100. While shown as distinct elements in FIG. 2, in some examples at least some components of the varifocal adjustment subsystem 206 may be integrated into the optics subsystem 204.

The optics subsystem 204 may be configured with a variety of states. In some examples, each state of the optics subsystem 204 may correspond to a focal distance of the HMD 100 or to a combination of the focal distance and the user's eye position relative to the optics subsystem 204. As an example of possible state configurations, the optics subsystem 204 may move within a range of approximately 5-10 mm with a positional accuracy of approximately 5-10 μm, which correlates to approximately 1000 distinct focal distances for the optics subsystem 204. While the optics subsystem 204 may be adapted to provide for any number of states, a relatively limited number of states may be sufficient to accommodate the sensitivity of the human eye. Accordingly, in some embodiments, the optics subsystem 204 may provide for fewer distinct focal distances. For example, a first state may correspond to a theoretically infinite focal distance (0 diopter), a second state may correspond to a focal distance of approximately 2.0 meters (0.5 diopter), a third state may correspond to a focal distance of approximately 1.0 meters (1 diopter), a fourth state may correspond to a focal distance of approximately 0.5 meters (2 diopters), a fifth state may correspond to a focal distance of approximately 0.330 meters (3 diopters), and a sixth state may correspond to a focal distance of approximately 0.250 meters (4 diopters). The varifocal adjustment subsystem 206 may thus set and change the state of the optics subsystem 204 to achieve a desired focal distance.

The focus prediction module 208 may represent an encoder including logic that tracks the position or state of the optics subsystem 204, such as to predict one or more future states or locations of the optics subsystem 204. For example, the focus prediction module 208 may accumulate historical information corresponding to previous states of the optics subsystem 204 and may predict a future state of the optics subsystem 204 based on the previous states. Because the HMD 100 may adjust the rendering of a virtual scene based on the state of the optics subsystem 204, the predicted state may allow scene the rendering module 220 to determine an adjustment to apply to the virtual scene for a particular frame. Accordingly, the focus prediction module 208 may communicate information describing a predicted state of the optics subsystem 204 for a frame to the scene rendering module 220.

The eye-tracking module 210 may be configured to track eye position and/or eye movement of a user of the HMD 100. A camera or other optical sensor inside the HMD 100 may capture image information of a user's eyes, and the eye-tracking module 210 may use the captured information to determine interpupillary distance, interocular distance, a three-dimensional (3D) position of each eye relative to the HMD 100 (e.g., for distortion adjustment purposes), a magnitude of torsion and rotation (i.e., roll, pitch, and yaw) for each eye, and/or gaze directions for each eye. In one example, infrared light may be emitted within the HMD 100 and reflected from each eye. The reflected infrared light may be received or detected by the camera and analyzed to extract eye rotation, location, and movement data from changes in the infrared light reflected by each eye. The eye-tracking module 210 may use any of a variety of methods to track the eyes of a user. In some examples, the eye-tracking module 210 may track up to six degrees of freedom of each eye (i.e., 3D position, roll, pitch, and yaw) and may combine at least a subset of the tracked quantities from two eyes of a user to estimate a gaze point of the user (i.e., a 3D location or position in the virtual scene where the user is looking). For example, the eye-tracking module 210 may integrate information from past measurements, measurements identifying a position of a user's head, and 3D information describing a scene presented by the display subsystem 202. Thus, the eye-tracking module 210 may use information for the position and orientation of the user's eyes to determine the gaze point in a virtual scene presented by the HMD 100 where the user is looking.

Further, in some examples the eye-tracking module 210 may correct for image distortions introduced when the user's eyes move. For example, the distance between a pupil and the optics subsystem 204 may change as the eye moves to look in different directions. The varying distance between pupil and the optics subsystem 204 as viewing direction changes may cause a distortion referred to as "pupil swim" and contributes to distortion perceived by the user as a result of light focusing in different locations as the distance between the pupil and the optics subsystem 204 changes. Accordingly, measuring distortion at different eye positions and pupil distances relative to the optics subsystem 104 and generating distortion corrections for different positions and distances allows mitigation of distortion caused by pupil swim. The distortion may be mitigated, for example, by tracking the 3D position of a user's eyes and applying a distortion correction corresponding to the 3D position of each of the user's eyes at a given point in time. Thus, knowing the 3D position of each of a user's eyes allows for the mitigation of distortion caused by changes in the distance between the pupil of the eye and the optics subsystem 104 by applying a distortion correction for each 3D eye position.

The vergence processing module 212 may determine a vergence depth of a user's gaze based on the gaze point or an estimated intersection of gaze lines determined by the eye-tracking module 210. In some examples, the term "vergence" may refer to the simultaneous movement or rotation of both eyes in opposite directions to maintain single binocular vision, which is naturally and automatically performed by the human eye. Thus, a user's eyes may verge to a point where the user is looking. The user's eyes may also individually focus on the vergence point. The vergence processing module 212 may determine the vergence depth in any suitable manner. For example, the vergence processing module 212 may triangulate the gaze lines (e.g., determined by the eye-tracking module 210) to estimate a distance or depth from the user associated with intersection of the gaze lines. In some examples, the HMD 100 may then use the depth associated with intersection of the gaze lines as an approximation for an accommodation distance, which identifies a distance from the user where the user's eyes are directed. Thus, the vergence distance allows determination of a location where the user's eyes are expected to be focused and a depth from the user's eyes at which the eyes are focused, thereby providing information (such as an object or plane of focus) for rendering adjustments to the virtual scene.

As described above, the varifocal adjustment subsystem 206 may dynamically vary a focal distance to bring images presented to a user into focus, which may keep the user's eyes in a zone of comfort as vergence and accommodation change. Additionally, eye-tracking in combination with varifocal adjustment may allow blurring to be introduced as depth cues in images presented.

The prescription accommodation subsystem 222 may include a mechanism for adjusting a focus of an image displayed by the display subsystem 202 that is separate from the varifocal adjustment subsystem 206. The prescription adjustment may be made to account for (e.g., to correct) a visual refractive error of the user. For example, the prescription accommodation subsystem 222 may include a prescription accommodation actuator configured to adjust the focus by modifying a distance between the display subsystem 202 and the optics subsystem 204, modifying a distance between two components (e.g., lenses) of the optics subsystem 204, and/or modifying an optical property (e.g., a lens shape) of a component of the optics subsystem 204. The prescription accommodation subsystem 222 may, in some embodiments, include a user input for indicating a prescription adjustment to be made. The user input may be a mechanical input, such as a knob, slider, or button, or an electronic input, such as a user selection of an option on a menu displayed on the HMD 100 or a user entry of prescription information (e.g., diopter information, an interpupillary distance, astigmatism information, etc.) into a graphical user interface of the HMD 100. In one example, the prescription accommodation subsystem 222 may include components for automatically detecting the user's visual refractive error(s), such as an infrared light source and an infrared camera to detect light refracted through and/or reflected from the user's eye. The prescription accommodation subsystem 222 may, in some embodiments, employ an electromechanical actuator to adjust the focus, such as by moving one or both of the display subsystem 202 or the optics subsystem 204, or by inducing a change in shape of a lens of the optics subsystem 204.

FIG. 3 illustrates one example of an HMD 300 to demonstrate how the tracking of a user's eyes 302 can be used in rendering a virtual object 304 at an appropriate focal distance. The HMD 300 may include an optics subsystem 306, a display subsystem 308, and an eye-tracking camera 310 positioned within an HMD housing 312.

A position, orientation, and/or a movement of the HMD 300 may be determined by a combination of the locators 114, the IMU 116, the head-tracking sensors 118, and the imaging device 260, as described above in conjunction with FIGS. 1-2. Portions of a virtual scene presented by the HMD 300 may be mapped to various positions and orientations of the HMD 300. Thus, a portion of the virtual scene currently viewed by the user may be determined based on the position, orientation, and movement of the HMD 300. After determining the portion of the virtual scene being viewed by the user, the HMD system 200 (FIG. 2) may then determine a location or virtual object 304 within the determined portion at which the user is determined or estimated to be looking, in order to adjust the focus of that location or object 304 accordingly.

To determine the location or object 304 within the determined portion of the virtual scene at which the user is looking, the HMD 300 may track positions and locations of the user's eyes 302. Thus, the HMD 300 may determine an eye position for each eye 302 of the user. For example, the eye-tracking camera 310 of the HMD 300 may track at least a subset of the 3D position, roll, pitch, and yaw of each eye 302 and use those quantities to estimate a 3D gaze point of each eye 302. As discussed above, the eye-tracking camera 310 may, in some embodiments, detect light (e.g., infrared light) directed toward and reflected from the eyes 302. Further, information from past eye positions, information describing a position of the user's head, and/or information describing a scene presented to the user may also be used to estimate the 3D gaze point of an eye 302 in various embodiments. In the example shown in FIG. 3, the eye-tracking camera 310 may capture images of the user's eyes 302, and the eye-tracking module 210 (FIG. 2) may determine an output for each eye 302 and gaze lines 314 corresponding to the gaze point or location where the user is looking.

A vergence depth ($d_v$) 316 of the gaze point for the user may be determined based on an estimated intersection of the gaze lines 314. As shown in FIG. 3, the gaze lines 314 may converge or intersect at the vergence depth 316, where the virtual object 304 may be displayed. Because virtual distances within the virtual scene may be known to the system, the vergence depth 316 may be filtered or verified to determine a more accurate vergence depth 316 for the virtual scene. For example, the vergence depth 316 may be an approximation of the intersection of the gaze lines 314, which are themselves an approximation based on the position of a user's eyes 302. The gaze lines 314 may not always appear to accurately intersect. Thus, in one embodiment, virtual distances within the virtual scene may be compared to the vergence depth 316 for the portion of the virtual scene to generate a filtered vergence depth 316.

Determining a more accurate vergence depth 316 or gaze point may enable the virtual scene to more accurately determine a user's object or plane of focus, allowing the scene rendering module 220 (FIG. 2) to add depth of field blur to proper depths and/or objects 304 in the virtual scene, or to otherwise modify the virtual scene to appear more realistic. Further, if a virtual scene includes multiple objects 304, the vergence processing module 212 (FIG. 2) may compare the estimated vergence depth 316 to distances associated with at least a subset of the objects 304. In one example, the minimum difference between distance to the object 304 and the estimated vergence depth 316 may be determined to be the filtered vergence depth; however, other methods of identifying the object 304 that specifies the filtered vergence depth 316 may be used in various embodiments.

Referring again to FIG. 2, a state of the optics subsystem 204 may be determined for a frame of a virtual scene based on states of the optics subsystem 204 during presentation of previous frames of the virtual scene. For example, the focus prediction module 208 may track the state of the optics subsystem 204 for various frames of the virtual scene to predict a state of the optics subsystem 204 for subsequent frames of the virtual scene. The predicted state of the optics subsystem 204 (e.g., a predicted location of the optics subsystem 204) may allow the scene rendering module 220 to determine an adjustment to apply to a frame of the virtual scene so that distortion caused by the predicted state of the optics subsystem 204 may correct or cancel the applied adjustment rather than distorting the frame. Thus, based on the state of the optics subsystem 204, a distortion correction may be determined for application to a frame of the virtual scene to correct an optical error that may be introduced by the state of the optics subsystem 204.

Accordingly, the focal distance may be adjusted for the presented frame of the virtual scene to provide accommodation for the generated filtered vergence depth by moving at least one of the display subsystem 202 or the optics subsystem 204.

Figure 4A:
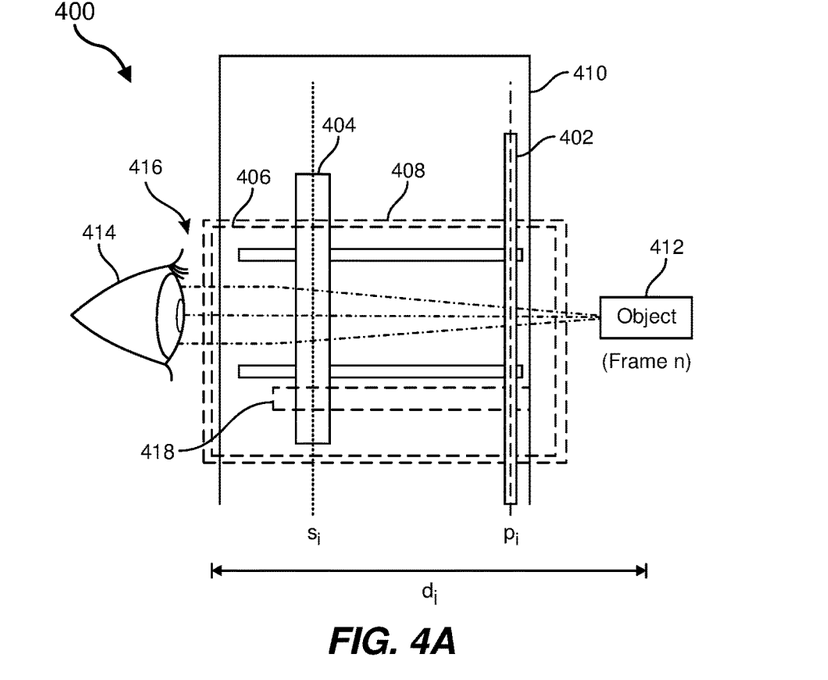
FIGS. 4A and 4B show cross-sectional views of a portion of an HMD, to illustrate an example process for adjusting the focal distance of the HMD by varying the distance between a display subsystem and an optics subsystem using a varifocal adjustment subsystem and/or prescription accommodation subsystem, in accordance with at least one embodiment.
Figure 4B:
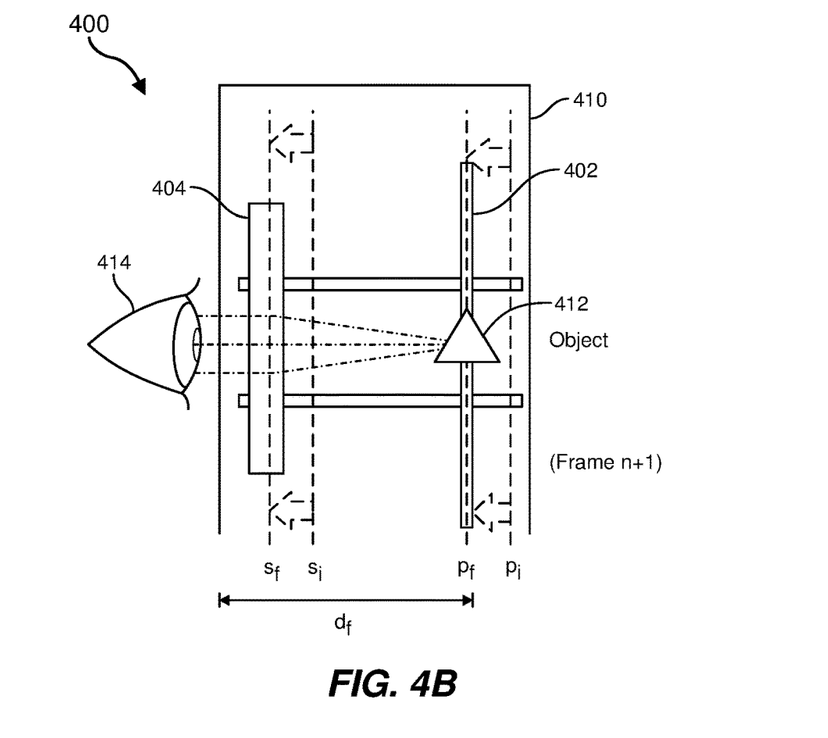

FIGS. 4A and 4B illustrate example adjustments of the focal distance of an HMD 400 by changing a distance between a display subsystem 402 and an optics subsystem 404 using a varifocal adjustment subsystem 406 and/or a prescription accommodation subsystem 408. In the example of FIGS. 4A and 4B, the varifocal adjustment subsystem 406 may include a varifocal adjustment actuator (e.g., a motor, rotational actuator, linear actuator, track, etc.) that may be configured to move the display subsystem 402, optics subsystem 404, or both relative to each other to dynamically adjust the adjust the focal distance from an initial focal distance $d_i$ to a final focal distance $d_f$. Examples of such components are described below with reference to FIGS. 5-7.

FIG. 4A shows the HMD 400 providing a focus adjustment for frame n of a scene. The HMD 400 may include the display subsystem 402, the optics subsystem 404, the varifocal adjustment subsystem 406, and the prescription accommodation subsystem 408, which may be mounted in an HMD frame 410. In this example, the scene includes a virtual object 412 displayed by the display subsystem 402 at which the gaze of user's eye 414 is directed (i.e., verged). A virtual image of the virtual object 412 may be located at an initial focal distance $d_i$, behind the display subsystem 402, from an exit pupil 416 of the user's eye 414. In the example of FIG. 4A, the display subsystem 402 is illustrated in an initial position $p_i$ and the optical subsystem 404 is illustrated in an initial position $s_i$, which may provide accommodation for an initial focal distance $d_i$ to enable comfortable viewing of the virtual object 412.

FIG. 4B shows the HMD 400 providing a focus adjustment for a subsequent frame n+1 of the virtual scene. The focus adjustment may result from operation of one or both of the varifocal adjustment subsystem 406 and the prescription accommodation subsystem 408. A first focus adjustment may be made by the prescription accommodation subsystem 408. For example, the HMD 400 may display the virtual object 412 at a known and steady perceived initial focal distance $d_i$, and the user may adjust the prescription accommodation subsystem 408 to bring the virtual object 412 into focus. This adjustment may be made independently for each of the user's eyes 414 to account for the individual refractive error(s) of each eye 414.

The prescription accommodation subsystem 408 may include a prescription accommodation actuator to make the adjustment. The prescription accommodation actuator may include one or more of gears, racks, tracks, electromechanical actuators, rotatable actuators, linear actuators, or voltage sources. For example, a knob (e.g., the prescription adjustment control element 106 shown in FIG. 1), button, slider, touchscreen, or other input may be provided for the user to manually make the prescription adjustment. In some embodiments, the user may interact with a virtual control option or selection to instruct the prescription accommodation subsystem 408 to make the prescription adjustment. In either case, the manual manipulation may result in the prescription adjustment via a mechanical and/or an electrical link to the prescription accommodation subsystem 408. Alternatively or additionally, a user's prescription information (e.g., astigmatism, diopter information, interpupillary distance, etc.) may be input into the HMD 400 and adjustments may be made automatically by the HMD 400. The prescription adjustments may be made by, for example, moving, with the prescription accommodation actuator, one or both of the optics subsystem 404 or the display subsystem 402 relative to each other (e.g., closer or farther away), and/or by moving the respective optics subsystems 404 of both of the user's eyes 414 relative to each other (such as to account for the user's interpupillary distance). In another example, the prescription adjustments may be made by altering an optical property of the optics subsystem 404, such as by altering a shape of a lens of the optics subsystem 404. For example, a so-called "liquid lens" may be employed in the optics subsystem 404, and a shape thereof may be modified by an electromechanical actuator and/or by applying an electrical voltage to an electroactive material thereof.

In some embodiments, a user's prescription adjustment may be stored in a computer memory of the HMD 400. When the HMD 400 is used at a later time, the HMD 400 may make the same prescription adjustment that was originally made by and for the user. The prescription adjustments of multiple users or according to multiple settings may be stored in the computer memory of the HMD 400, and a particular user may select an appropriate profile or setting or may otherwise provide an indication for the HMD 400 to make a desired prescription adjustment for that user. In additional embodiments, the prescription adjustment made may be semi-permanent, staying in or reverting to the adjusted state from one use to the next use until a user makes a further prescription adjustment.

Optionally, the HMD 400 may include a locking system 418 that is configured to lock a setting (e.g., position) of at least one of the prescription accommodation subsystem 408 or the varifocal adjustment subsystem 406 when the HMD 400 is powered down. For example, the locking system 418 may include a pin, paddle, lever, or gear that is configured to lock the setting by engaging with a component of the prescription accommodation subsystem 408, the varifocal adjustment subsystem 406, the display subsystem 402, and/or the optics subsystem 404. The locking system 418 may be actuated by any suitable mechanism, such as by a linear actuator, a rotational actuator, a shape-memory alloy material (e.g., a nitinol wire), a bi-stable solenoid, a leadscrew, a flexure element, a lever, etc.

In some embodiments, after the prescription accommodation subsystem 408 has been used to make a prescription adjustment to accommodate a user's refractive error(s), the varifocal adjustment subsystem 406 may be used to make additional adjustments to a focus of the image(s) displayed by the HMD 400, such as to account for movement of the virtual object 412 in the virtual scene and/or to account for a change in a gaze of the user. Thus, the prescription adjustment may be made to account for refractive error(s) in the user's eyes 414, and the varifocal adjustments may be made to account for movement of the user's eyes 414, changing of the user's gaze, movement of the virtual object 412, and other optical changes that may occur during operation of the HMD 400.

For example, the user's eyes 414 may have been repositioned to look at the virtual object 412, and/or the virtual object 412 may have moved toward the user's eyes 414 in the displayed scene. As a result, the image of the virtual object 412 may be located close to the display subsystem 402, as illustrated in FIG. 4B. In response to the location of the virtual object 412 being close to the display subsystem 402, which is closer than the object 412 in FIG. 4A, the user's eyes 414 may rotate inward to verge on the virtual object 412, causing vergence processing module 212 (FIG. 2) to determine a final vergence depth $d_f$ for frame n+1 and to provide the final vergence depth $d_f$ to the varifocal adjustment subsystem 206. Based on the final vergence depth $d_f$, the varifocal adjustment subsystem 206 may, with a varifocal adjustment actuator, move the display subsystem 402 from the initial position $p_i$ to a final position $p_f$ and/or may move the optics subsystem 404 from its initial position $s_i$ to its final position $s_f$ to accommodate the user's eyes 414 at the final vergence depth $d_f$ for the closer virtual object 412 shown in FIG. 4B. Additionally or alternatively, at least one optical property of the optical subsystem 404 may be changed to accommodate the final vergence depth $d_f$, such as by modifying a shape of a lens (e.g., a liquid lens) of the optical subsystem 404.

In the example shown in FIGS. 4A and 4B, both of the display subsystem 402 and the optics subsystem 404 have moved from their respective initial positions $p_i$ and $s_i$ to their respective final positions $p_f$ and $s_f$. These movements may be made by only one or both of the varifocal adjustment subsystem 406 and the prescription accommodation subsystem 408. In some embodiments, a portion of one or both of these movements may be made by both of the varifocal adjustment subsystem 406 and the prescription accommodation subsystem 408. In additional embodiments, only one of the display subsystem 402 or the optics subsystem 404 may be moved relative to the HMD frame 410.

In one example, each state of the optics subsystem 404 and display subsystem 402 may correspond to a combination of focal distance and eye position, provide accommodation for a range of vergence depths, and/or be associated with a specific position of the optics subsystem 404 and/or display subsystem 402. Accordingly, vergence depths may be mapped to positions of the optics subsystem 404 and/or display subsystem 402 and stored in a lookup table. Thus, when a vergence depth is received from the vergence processing module 212 (FIG. 2), the varifocal adjustment subsystem 406 may automatically move one or both of the optics subsystem 404 or the display subsystem 402 to a position corresponding to the received vergence depth based on the lookup table.

In some instances, artificial reality systems may aim to present users with a virtual environment that closely simulates a real-world environment or that provides users with content causing the users to be immersed in the illusion created by the artificial reality systems. To provide users with a realistic or captivating virtual environment, an artificial reality system may implement multiple systems and methods discussed herein to operate together at efficiencies that are imperceptible to a user. For example, transition delays are particularly costly to user experience with artificial reality systems. If a user is waiting for the virtual scene presented by an HMD to catch up to what the user's brain is already expecting, the illusion may be broken, and/or the user may become uncomfortable (e.g., with nausea, a headache, etc.). However, certain processing speeds and commercially available actuators may currently be faster than the coordination of the human eye to change optical properties (e.g., lens shape, lens position, etc.) of optical subsystems, and the human brain to register what the altered optical subsystems are focused on, allowing the disclosed systems and methods to provide users with high-quality virtual environments.

A frame of a virtual scene being viewed by a user may be displayed by the display subsystem 402 with a distortion correction to correct optical errors that may be caused by the determined state of the optics subsystem 404 and with depth-of-field blur based on the vergence depth. Further, the varifocal adjustment subsystem 406 may change the focus of the optics subsystem 404 to provide focus and accommodation to the location in the portion of the virtual scene where the user's eyes 414 are verged.

Display of a scene by the HMD 400 may be modified to mitigate distortion introduced by optical errors of the optics subsystem 404 included in the HMD 400. A distortion correction may be applied to the scene that pre-distorts the scene, and distortion caused by the optics subsystem 404 may compensate for the pre-distortion as light from the modified scene passes through the optics subsystem 404. As a result, the scene viewed by the user may not be distorted or may be less distorted than without such corrections. Accordingly, distortion corrections may account for different levels and types of distortion caused by different eye positions relative to the optics subsystem 404 or different focal distances of the HMD 400. In one example, the distortion corresponding to different potential eye positions relative to the optics subsystem 404 and at potential focal distances for the HMD 400 may be determined by measuring a wavefront (i.e., propagation of points of the same phase) of light from the display subsystem 402 after the light has passed through the optics subsystem 404. Different eye positions relative to the optics subsystem 404 and different states of the optics subsystem 404 may cause different degrees of optical error in light directed through the optics subsystem 404. This optical error may distort light from the display subsystem 402 included in the HMD 400, which may impair presentation of a virtual scene to a user. Accordingly, distortion correction maps may be generated based on measurements of the wavefront for different states of the optics subsystem 404 to correct for optical error introduced by the different states of the optics subsystem 404, which accounts for different focal distances of the HMD 400.

As described above, the varifocal adjustment subsystem 406 may enable dynamic adjustment of the focal distance of the HMD 400 to keep the user's eyes 414 in a zone of comfort as vergence and accommodation change. In one embodiment, the varifocal adjustment subsystem 406 may physically change the distance between the display subsystem 402 and the optics subsystem 404 by moving the display subsystem 402 or the optics subsystem 404 (or both). The movement or translation of two lenses that are part of the optics subsystem 404 relative to each other may also be used to change the focal distance of the optics subsystem 404 of the HMD 400 to change the focal distance. Additionally or alternatively, a shape of a lens (e.g., a liquid lens) of the optics subsystem 404 may be altered to change the focal distance. In other embodiments, the varifocal adjustment subsystem 406 may adjust focal distance using solid-state methods, such as by adjusting the focus of the displayed images.

In some embodiments, the varifocal adjustment subsystem 406 and the prescription accommodation subsystem 408 may be configured to make optical adjustments using separate mechanisms. For example, a varifocal adjustment actuator may be distinct from a prescription accommodation actuator. In one example, at least a portion of the varifocal adjustment subsystem 406 may be mounted on the prescription accommodation subsystem 408 (e.g., on a movable structure of the prescription accommodation subsystem 408) to be moved by the prescription accommodation actuator. In this example, prescription adjustments made by the user may move the varifocal adjustment subsystem 406 relative to the HMD frame 410.

Actuation of the varifocal adjustment actuator may be controlled by a processor, while actuation of the prescription accommodation actuator may be manually controlled by the user. In one example, adjustments made by the varifocal adjustment actuator may be relatively faster than adjustments made by the prescription accommodation actuator. In embodiments in which a distance between the display subsystem 402 and the optical subsystem 404 is altered, the prescription accommodation subsystem 408 may be configured to alter the distance across a maximum prescription range, and the varifocal adjustment subsystem 406 may alter the distance across a maximum varifocal range. In one example, the maximum varifocal range may be shorter than the maximum prescription range.

FIG. 5 shows an example of an assembly 501 of an HMD 500 with a varifocal adjustment subsystem 530 and prescription accommodation subsystem 540 corresponding to a single eye of a user that includes a display subsystem 502 and an optics subsystem 504. Thus, HMD 500 would include two similar assemblies 501 of the HMD 500 that may include two display subsystems 502, optics subsystems 504, varifocal adjustment subsystems 530, and prescription accommodation subsystems 540; however, in other embodiments, the HMD 500 may include a single display subsystem 502, a single varifocal adjustment subsystem 530, and/or a single prescription accommodation subsystem 540. Additionally, other configurations of components described herein may be used in other embodiments.

The varifocal adjustment subsystem 530, in one embodiment, may include a varifocal adjustment actuator 532 (e.g., a DC brushed or brushless motor, a stepper motor, etc.) and/or a varifocal drive mechanism 534 (e.g., a power screw, a ball screw, a geared spindle drive, etc.), which may be fixed relative to the optics subsystem 502 (e.g., mounted directly to the optics subsystem 502, a housing of the HMD 500, or a secondary bracket of the HMD 500, etc.) to move the display subsystem 502 toward and/or away from the optics subsystem 504 along an optical axis 550.

The prescription accommodation subsystem 540, in one embodiment, may include a prescription accommodation actuator 542 (e.g., a DC brushed or brushless motor, a stepper motor, a manual knob, etc.) and/or prescription adjustment drive mechanism 544 (e.g., a power screw, a ball screw, a geared spindle drive, etc.), which may be fixed to the varifocal adjustment actuator 532 (e.g., via a varifocal bracket 536) to move the varifocal adjustment actuator 532 together with the display subsystem 502 toward and/or away from the optics subsystem 504 along the optical axis 550.

In some embodiments, the optics subsystem 504 of the HMD 500 may include a camera 506 and a hot mirror 508. As described above, the position of the display subsystem 502 may be driven by (or adjusted in response to) a plane of focus corresponding to a vergence depth determined from the vergence angle of the user's eyes, as a function of real-time eye-tracking accomplished using the camera 506, for example. The position of each eye may be captured by the camera 506, which may be located off-axis (i.e., at an angle relative to the optical axis 550), in one embodiment. In this embodiment, the camera 506 may be an infrared (IR) camera that receives IR light reflected from the eye of the user via the hot mirror 508 located between the display subsystem 502 and the optics subsystem 504. The hot mirror 508 may be positioned at an angle relative to the display subsystem 502 in order to reflect the IR light off-axis toward the camera 506. Here, the hot mirror 508 may be transparent to visible light to allow visible light from the display subsystem 502 to pass through to a viewing user unimpeded while reflecting the IR light to the camera 506. Thus, the camera 506 may capture IR light reflected from a retina of the user (via the hot mirror 508) and this information for the position of the user's eye may be provided to determine the vergence depth.

Accordingly, the focal distance of the HMD 500 may be adjusted to accommodate refractive error(s) of the user's eye(s) by the prescription accommodation subsystem 540 and to match the determined vergence depth by the varifocal adjustment subsystem 530. The prescription accommodation actuator 542 may be used to initially move the display subsystem 502 relative to the optics subsystem 504 to focus an image displayed by the HMD 500 in consideration of the user's refractive error(s). Thereafter and during operation of the HMD 500, the varifocal adjustment actuator 532 may, in substantially real-time, move the display subsystem 502 relative to the optics subsystem 504 to focus the image displayed by the HMD 500 to the determined vergence depth utilizing screen positioning feedback, such as via a linear or proximity encoder 510. In this implementation, a positional precision of ~100 microns or better may be achievable with commercially available linear encoding systems.

In this example, the optics subsystem 504 may be fixed within the HMD 500 and the display subsystem 502 may be moved relative to the optics subsystem 504 based on the prescription adjustments and the varifocal adjustments. In additional examples, the display subsystem 504 may be fixed within the HMD 500 and the optics subsystem 504 may be moved relative to the display subsystem 502.

FIG. 6 shows an assembly 601 of another example HMD 600 that includes a varifocal adjustment subsystem 630 and a separate prescription accommodation subsystem 640 supported by an HMD housing 606. The varifocal adjustment subsystem 630 may employ a cam 632 and roller 634 drive mechanism to move a display subsystem 602 relative to an optics subsystem 604. The cam 632 of the varifocal adjustment subsystem 630 may be rotatable by an actuating motor 636 (e.g., a DC brushed or brushless motor, a stepper motor, etc.). The roller 634 of the varifocal adjustment subsystem 630 may be connected to a display bracket 638 to which the display subsystem 630 (or a component thereof) is mounted. The roller 634 may be positioned and configured to engage the cam 632 to move the display subsystem 602 toward and away from the optics subsystem 604 as the cam 632 rotates. The cam 632 and roller 634 may engage each other via gears and/or by sliding contact. In some embodiments, the roller 634 may and the cam 632 may be biased against each other, such as with a spring.

In one example, the prescription accommodation subsystem 640 may include a block 642 mounted to the HMD housing 606 and a track 644 within or coupled to the block 642. The actuating motor 636, and consequently the cam 632, of the varifocal adjustment subsystem 630 may be movable along the track 644 of the block 642 upon actuation of the prescription accommodation subsystem 640. The cam 632 may be held in its rotational position during such a prescription adjustment, resulting in the roller 634, display bracket 638, and display subsystem 602 moving along with the actuating motor 636 and cam 632 relative to the optics subsystem 604.

In another embodiment, the prescription accommodation subsystem 640 may include a prescription actuator configured to move the optical subsystem 604 relative to the HMD housing 606, and the varifocal adjustment subsystem 630 may be configured to move the display subsystem 602 relative to the HMD housing 606. Thus, the prescription accommodation subsystem 640 and the varifocal adjustment subsystem 630 may each be used to adjust a distance between the display subsystem 602 and the optical subsystem 604.

FIG. 7 shows an HMD 700 including an assembly 701 for one user eye according to another embodiment of the present disclosure. The HMD 700 may include a display subsystem 702, an optical subsystem 704, a varifocal adjustment subsystem 730, and a prescription accommodation subsystem 740. In this example, the prescription accommodation subsystem 740 may include one or more prescription accommodation actuators 742 to move the display subsystem 702 (or a component thereof, e.g., an electronic display) relative to the optical subsystem 704. The varifocal adjustment subsystem 730 may include a deformable lens, such as a liquid lens assembly 732. The liquid lens assembly 732 may include a deformable optical element 734 adjacent to a deformable medium 736. One or more varifocal adjustment actuators 738 may be positioned and configured to modify a shape of the liquid lens assembly 732. For example, the varifocal adjustment actuators 738 may be electromechanical actuators configured press down (from the perspective of FIG. 7) on an outer peripheral region of the deformable optical element 734 to induce a convex (or more convex) shape in a central region of the deformable optical element 734 or, conversely, pull upward on the outer peripheral region to induce a concave (or more concave) shape in the central region. In another example, the deformable optical element may include an electroactive material that changes shape upon application of a sufficient voltage, and the varifocal adjustment actuators 738 may include a driver circuit for applying the sufficient voltage as desired.

FIGS. 5-7 illustrate, by way of example, several different actuation mechanisms that provide for prescription accommodation and varifocal adjustment. However, the present disclosure is not limited to such actuation mechanisms. Indeed, the present disclosure may include any combination of the actuation mechanisms described and shown herein. For example, actuation mechanisms described in relation to varifocal adjustments may be used for prescription adjustments, and vice versa. Additionally, other actuation mechanisms may be employed for either or both of the prescription adjustments and varifocal adjustment, including but not limited to voice coil actuators, rotatable gears, rack and pinion mechanisms, linear actuators, ratchet mechanisms, pivoting arms, flexure mechanisms, worm gears, belt drives and pulleys, other pulley systems, shape-memory alloys, friction drive wheels and plates, threaded rings and pins, solenoids, magnetic elements, piezoelectric elements, pneumatic or hydraulic actuators, or any combination thereof.

FIG. 8 illustrates a method 800 for adjusting at least one optical property of an HMD system. In operation 810, an image may be displayed on a display subsystem of the HMD system for viewing by a user through an optics subsystem. The optics subsystem may include at least one lens. The display of the image may be accomplished by any of the display subsystems described herein.

In operation 820, a focus of the image may be adjusted, with a prescription accommodation subsystem, to account for the user's visual refractive error. For example, a prescription accommodation actuator may be used to move one or both of the optical subsystem or the display subsystem relative to each other. The prescription adjustment may be accomplished manually, automatically, or any combination thereof. Additionally or alternatively, the prescription accommodation actuator may alter a shape of a lens (e.g., a liquid lens) of the optical subsystem, or may change a distance between lenses of the optical subsystem. This prescription adjustment may be performed by any of the actuators described herein with respect to varifocal adjustment or prescription accommodation subsystems. The prescription adjustment may be performed as a result of a user input (e.g., an input of prescription information, a manual turning of a knob, a manual sliding of a slider, etc.). In some embodiments, the prescription adjustment may be performed based one or more settings retrieved from computer memory, corresponding to the user's visual refractive error. In one example, the user's visual refractive error may be automatically detected prior to adjusting to account for the user's visual refractive error.

In operation 830, the focus of the image may be further adjusted with a varifocal adjustment subsystem, such as with a varifocal adjustment actuator. This varifocal adjustment may be performed to change a perceived view of the image, such as to account for vergence of the user's eyes or to account for virtual movement of an object displayed by the image. This varifocal adjustment may be performed by any of the actuators described herein with respect to varifocal adjustment or prescription accommodation subsystems. For example, the varifocal adjustment actuator may be one or more piezoelectric actuators and/or voice coil actuators. The varifocal adjustments may be performed at least in part based on an electronic signal, such as based on data received from an eye-tracking system. The prescription adjustments made in operation 820 may be maintained during the varifocal adjustments of operation 830.

The prescription adjustments made in operation 820 may, in some embodiments, include adjusting a distance between the display subsystem and the optics subsystem across a maximum prescription range. Similarly, the varifocal adjustments made in operation 830 may include adjusting the distance between the display subsystem and the optics subsystem across a maximum varifocal range. In some embodiments, the maximum varifocal range may be shorter than the maximum prescription range. In addition, the prescription adjustments made in operation 820 may include adjusting a position of the varifocal adjustment actuator.

The method 800 may be performed at least in part by a computing device. For example, a non-transitory computer-readable medium may include computer-executable instructions that, when executed by at least one processor of the computing device, cause the computing device to perform one or more of the operations 810, 820, and/or 830. For example, the computing device may direct the display subsystem to display the image, direct the prescription accommodation actuator to adjust a focus of the image to account for the user's visual refractive error, and/or direct the varifocal adjustment actuator to further adjust the focus of the image.

Accordingly, the present disclosure describes HMD systems and methods for providing both prescription accommodation and varifocal adjustments. The disclosed embodiments may enable HMD users to avoid using separate eyeglasses with the HMD or obtaining custom prescription lens inserts. Additionally, the systems and methods may improve user comfort when using the HMD systems.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data (e.g., from an eye-tracking sensor, from a display subsystem, etc.) to be transformed, transform the data, output a result of the transformation to determine an appropriate adjustment to an HMD, use the result of the transformation to make the determined adjustment, and store the result of the transformation to make future adjustments. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A head-mounted display system, comprising:
   a display subsystem configured to display an image to a user;
   an optics subsystem comprising at least one lens;
   a prescription accommodation subsystem comprising a prescription accommodation actuator configured to adjust a focus of the image to account for the user's visual refractive error; and
   a varifocal adjustment subsystem comprising a varifocal adjustment actuator configured to further adjust the focus of the image viewed by the user through the optics subsystem to change a perceived view of the image on the display subsystem, wherein the prescription accommodation actuator comprises a manual adjustment input for the user to adjust a position of the varifocal adjustment subsystem within the head-mounted display system.

2. The head-mounted display system of claim 1, wherein the prescription accommodation subsystem is configured to adjust the focus of the image by adjusting a distance between the display subsystem and the optics subsystem.

3. The head-mounted display system of claim 1, wherein the varifocal adjustment actuator is configured to modify a shape of a lens of the optics subsystem to adjust the focus of the image.

4. The head-mounted display system of claim 1, wherein the varifocal adjustment subsystem is mounted on the prescription accommodation subsystem to be moved by the prescription accommodation actuator.

5. The head-mounted display system of claim 1, wherein the varifocal adjustment actuator is configured to adjust the focus of the image by adjusting a distance between the display subsystem and the optics subsystem.

6. The head-mounted display system of claim 1, wherein the varifocal adjustment actuator is mounted on a movable structure of the prescription accommodation subsystem.

7. The head-mounted display system of claim 1, further comprising a locking system configured to lock a setting of at least one of the prescription accommodation subsystem or the varifocal adjustment subsystem when the head-mounted display system is powered down.

8. A method for adjusting at least one optical property of a head-mounted display system, comprising:
   displaying an image on a display subsystem of a head-mounted display system for viewing by a user through an optics subsystem comprising at least one lens;
   adjusting, with a prescription accommodation actuator of a prescription accommodation subsystem, a focus of the image to account for the user's visual refractive error by manipulating a mechanical user input; and further adjusting, with a varifocal adjustment actuator of a varifocal adjustment subsystem, the focus of the image viewed by the user through the optics subsystem to change a perceived view of the image on the display subsystem.

9. The method of claim 8, wherein the step of adjusting to account for the user's visual refractive error is performed based on an input from the user.

10. The method of claim 8, wherein the step of adjusting to account for the user's visual refractive error is performed based on one or more settings, retrieved from a computer memory, corresponding to the user's visual refractive error.

11. The method of claim 8, wherein:
adjusting, with the prescription accommodation actuator, the focus of the image comprises adjusting the distance between the display subsystem and the optics subsystem across a maximum prescription range; and
further adjusting, with the varifocal adjustment actuator, the focus of the image comprises adjusting the distance between the display subsystem and the optics subsystem across a maximum varifocal range that is shorter than the maximum prescription range.

12. The method of claim 8, wherein the step of further adjusting, with the varifocal adjustment actuator, the focus of the image is performed using one or more piezoelectric actuators or voice coil actuators of the varifocal adjustment subsystem.

13. The method of claim 8, wherein the step of further adjusting, with the varifocal adjustment actuator, the focus of the image is performed using a rotary actuator and a leadscrew of the varifocal adjustment subsystem.

14. The method of claim 8, wherein the step of further adjusting, with the varifocal adjustment actuator, the focus of the image is performed based at least in part on data received from an eye-tracking system.

15. The method of claim 8, wherein adjusting, with the prescription accommodation actuator, the focus of the image comprises adjusting a position of the varifocal adjustment actuator.

16. The method of claim 8, wherein the step of further adjusting, with the varifocal adjustment actuator, the focus of the image is performed in response to an electronic signal.

17. The method of claim 8, further comprising automatically detecting the user's visual refractive error prior to adjusting to account for the user's visual refractive error.

18. A non-transitory computer-readable medium comprising one or more computer-executable instructions that, when executed by at least one processor of a computing device, cause the computing device to:
display an image on a display subsystem of a head-mounted display system for viewing by a user through an optics subsystem comprising at least one lens;
adjust, with a prescription accommodation actuator of a prescription accommodation subsystem, a focus of the image on the display subsystem to account for a user's visual refractive error;
adjust, with a varifocal adjustment actuator of a varifocal adjustment subsystem, the focus of the image on the display subsystem viewed by the user through to optics subsystem to change a perceived view of the image on the display subsystem; and
lock, with a locking system, a setting of at least one of the prescription accommodation subsystem or the varifocal adjustment subsystem when the head-mounted display system is powered down.

* * * * *

UNITED STATES PATENT AND TRADEMARK OFFICE
CERTIFICATE OF CORRECTION

Page 1 of 1

PATENT NO.          : 11,150,437 B1
APPLICATION NO.     : 16/280471
DATED               : October 19, 2021
INVENTOR(S)         : Ryan Michael Ebert It is certified that error appears in the above-identified patent and that said Letters Patent is hereby corrected as shown below:

In the Claims

In Column 22, Line 26, Claim 18, delete "to optics" and insert -- the optics --.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*